INVENTOR.
James MacVeigh
BY
George R. Ericson
ATTORNEY

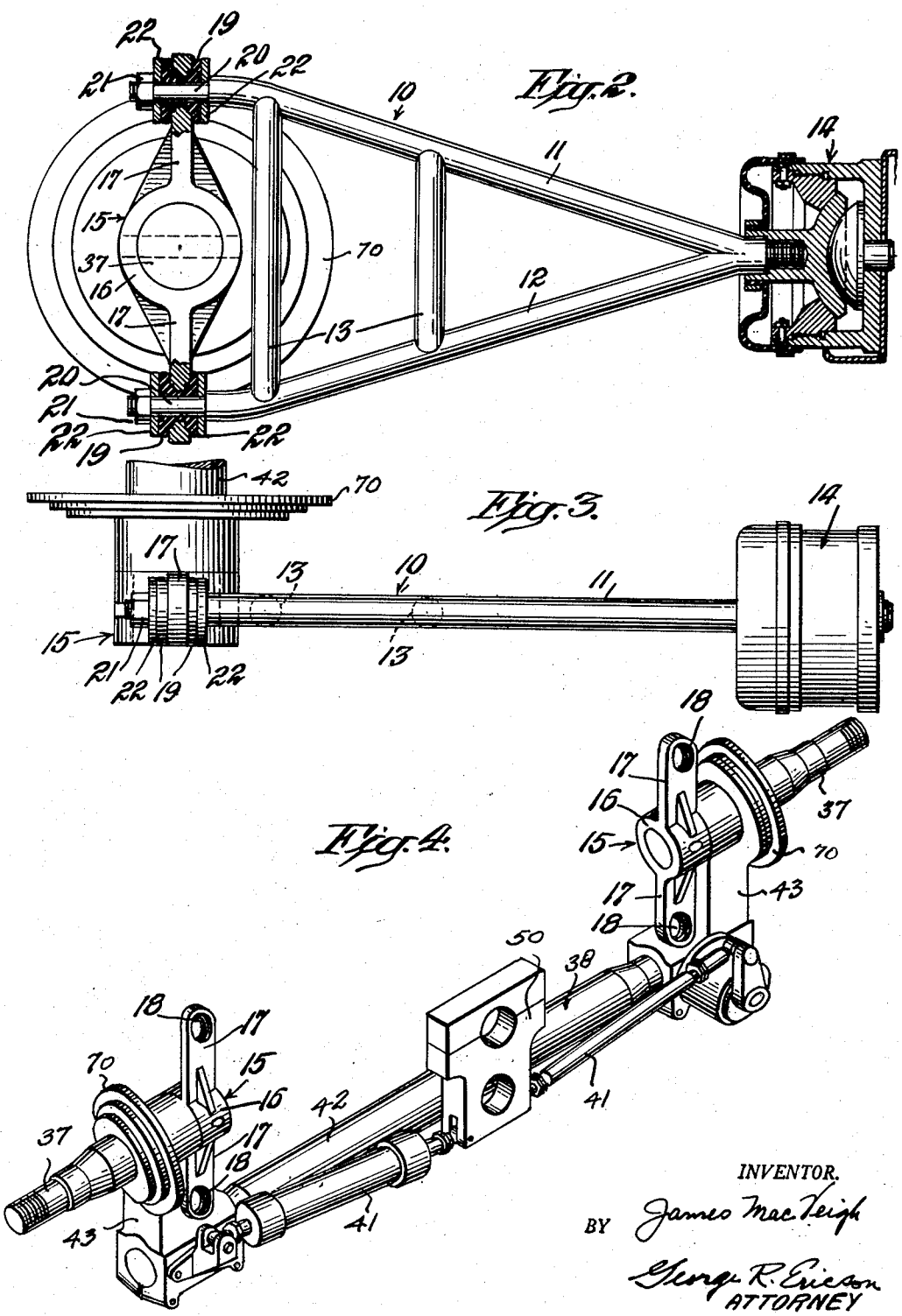

Patented Aug. 4, 1953

2,647,470

UNITED STATES PATENT OFFICE 2,647,470

AXLE MOUNTING

James MacVeigh, New York, N. Y., assignor to Patentes Talgo, S. A., Madrid, Spain, a corporation of Spain Application April 22, 1949, Serial No. 88,969

6 Claims. (Cl. 105—4)

This invention relates to structure for connecting an axle to a vehicle frame, and more particularly to radius rod structure and mountings.

Radius rod structures are often connected by universal joints with the axle and frame of a vehicle. The universal connection with the axle often includes a rubber mounting arranged to resist turning of the axle about its axis to thereby resist braking torque.

It is an object of this invention to provide a universal connection of the type referred to between an axle and vehicle frame whereby there will be minimum distortion strain of the rubber mounting resulting from braking torque.

A further object of the invention is to provide a mounting between a radius rod and a vehicle axle that will have a true universal joint action.

Another object of the invention is to provide a novel form of radius rod structure for use between an axle and vehicle body.

These and other objects of the invention will be apparent to those skilled in the art from a study of the following description and accompanying drawings, in which:

Fig. 2 is a side view of one of the radius rods and end mountings.

Fig. 3 is a plan view of the structure shown in Fig. 2.

Fig. 4 is a perspective view of the dead axle looking toward the rear of the car and showing the horizontal struts.

Figure 1:
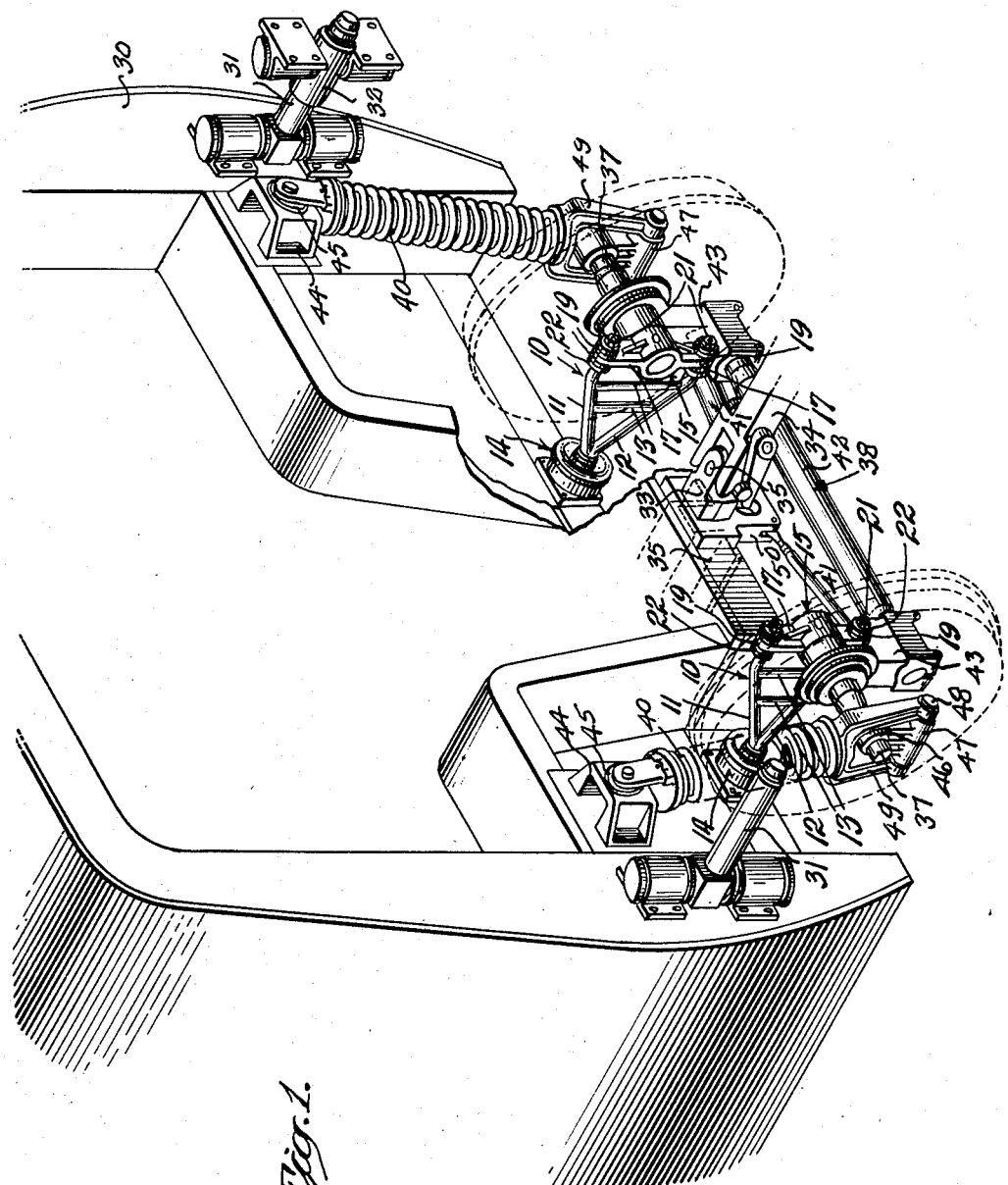
Fig. 1 is a perspective view of the rear end of one of the cars or vehicle sections showing the wheel suspension.

The rigid tubular vehicle or car 30 shown in the drawings is one section of an articulated train of the type shown in my application No. 758,887 filed July 3, 1947. The car body is connected at each end to an adjacent car end by sliding, weight-bearing lateral connections 31, the connections illustrated being the sliding element for engaging a guide element 32 on the adjacent car. The adjacent ends of the cars are also connected by a coupling consisting of male member 33 and female member 34 secured together by a pin 35. These coupling members may be secured to the ends of the framing 35 of the cars. A pair of wheels 36 is located at the rear end of each car body near the coupler pin 35. The wheels 36 are mounted on stub shafts 37 forming part of a dead axle 38.

The wheel mounting involves a series of parts connecting the dead axle 38 with the rear end of one of the car bodies 30. These connecting parts include a pair of substantially vertical spring struts 40, a pair of horizontal radius rods 10 normally extending parallel to the axis of the car body, and horizontal struts 41 extending substantially parallel to the axle 38 and are connected between anchor plate 50 on the car frame and the axle. Universal joints are provided at each end of such connecting parts.

The spring struts 40 carry the weight of the adjacent ends of adjacent car bodies which are connected by the lateral connections 31. The universal joints permit them to act independently, that is, to allow relative tipping of the car body and the axle 38. The universal joints also permit relative lateral movement of the body and the axle 38 in the case of side thrusts, but during such movement the axle 38 is maintained perpendicular to the axis of the body section to which the radius rods 10 are attached by virtue of the horizontal parallelogram construction. Any lateral movement of the body with respect to the axle is resisted by the horizontal struts 41.

The system of connections permits relative movement of the wheels and body in every direction in the vertical plane of the axis of the wheels, and thus provides for every conceivable position of the wheels with respect to the body within the limits necessary for good riding, and provides return forces to bring the body and wheels back to their normal relation as soon as disturbing forces have disappeared.

The dead axle 38 is a rigid structure consisting of the two stub shafts 37 and a central bar 42 connected by elbow members 43 which serve to offset the stub shafts from the bar 42 to allow a lowering of the car's center of gravity.

The upper end of each strut 40 is secured to a bracket 44 mounted on the car body at one side of its rear end and most desirably near or above its center of gravity and close to one of the lateral connections 31 between the ends of adjacent bodies. The upper end of each strut 40 is connected to its bracket 44 by means of a universal joint 45 of the spherical bearing type. The lower end of each strut 40 is connected to one of the outer ends by the dead axle 30 by means of a universal joint including horizontal and vertical pivots. The horizontal pivot is the end of the stub shaft 31 on which a sleeve 46 is journalled. An extension of this sleeve carries the bearing 47 for a horizontal pivot pin 48 mounted in a fork 49 at the lower end of the strut.

Each radius rod structure 10 consists of a V-shaped frame having top and bottom members 11, 12 secured together by cross-members 13. The members 11, 12 converge at one end of the rod 10 and are there attached to the car frame through a universal joint 14.

The outer ends of the members 11 and 12 are secured in hangers 15 mounted on the axle structure. Each hanger 15 consists of a sleeve 16 fitting over the inner end of one of the stub shafts of the axle structure and pinned to it to prevent rotation, and vertical arms 17 having transverse holes 18 in their ends. The holes 18 are recessed and in each of them is set a spool-shaped block 19 of hard rubber.

Parallel studs 20 of reduced diameter formed on the outer ends of the members 11, 12 of the rod 10 extend through the rubber blocks 19. By means of nuts 21, the rubber blocks are clamped between washers 22 on the studs 20.

The rubber blocks 19 yield sufficiently to permit the rods 10 to turn on vertical axes with respect to the axle structure. The rubber blocks offer some spring resistance to this movement. This permits lateral movements of the axle structure. By compression of one of the rubber blocks and expansion of the other, a slight turning of the rod 10 about the axis of the wheels is permitted. The rubber blocks offer a strong spring resistance to such movement. This action permits and at the same time restrains tilting of the axle structure and also allows for a slight turning of the axle structure about its axis when conventional brakes are applied to react against brake plates 70 fixed on the axle. The rubber blocks 19, therefore, absorb the braking shock.

This mounting of the radius rod structures on the axle provides a true universal joint connection since the vertical axis of turning intersects the horizontal axis of turning. Thus, distortion strains on the rubber in the joint connections is avoided.

The invention may be modified in various respects as will occur to those skilled in the art and the exclusive use of all modifications as come within the scope of the appended claims is contemplated.

What is claimed is:

1. A mounting for railway cars, comprising the combination with a car body and a wheel axle, of a pair of substantially vertical spring struts supporting opposite sides of the end of the car on the axle, universal joints at each end of each vertical strut, a pair of parallel horizontal radius rods, universal joints connecting the radius rods to the vehicle body, and jointed means connecting the rods with the axle, the jointed connecting means having vertical axes intersecting the turning axis of the axle and including resilient means resisting torque tending to turn the axle about a horizontal axis, allowing restricted endwise movement of the axle relative to the radius rods and restricted downward tilting of the adjacent end of the car body.

2. In a mounting for railway cars, the combination with a car body and a wheel axle, of a pair of longitudinally extending radius rods at one end of the car body, universal joints connecting the rods at one end to the car body, and top and bottom pivotal connections between the other ends of the rods and the axle, said connections of each rod having vertical axes intersecting the turning axis of the axle and including resilient means permitting spring opposed relative turning of the axle and the rods about vertical axes and limited more strongly spring opposed relative turning of the axle and the rods about a horizontal axis.

3. In a mounting for railway cars, the combination of a dead axle, two wheels rotatably mounted on said axle, braking means reacting between said wheels and the axle, separate spring devices supporting opposite sides of the car body on the axle, a pair of radius rods extending in a direction longitudinally of the car and having forked outer ends straddling the axle, universal joints connecting the inner ends of the rods to the body of the vehicle, and joint connections between the forked ends of the rods and the axle having their vertical axes intersecting the turning axis of the axle and including resilient means for permitting a strongly spring opposed rotation of the axle with respect to the rods about the axis of the axle so as to cushion the braking torque.

4. In a mounting for connecting an axle with a vehicle body, a V-shaped radius rod structure, a universal joint connecting the apex portion of the rod structure with the body, a hanger sleeve fixed to the axle having aligned arms on a vertical line intersecting the axis of the axle, and joint connections between the forked ends of the radius rod structure and the hanger arms, said connections including rubber for restricting turning movement of the axle about its axis.

5. In a mounting for connecting an axle with a vehicle car body, a radius rod structure, a universal joint connecting one end of the rod structure to the car body, the other end of the rod structure being forked to straddle the axle, a sleeve fixed to the axle having arms projecting therefrom in a line vertically intersecting the axis of the axle, said arms having openings for receiving the forked end of the rod structure, rubber mountings for the portions of the forked ends of the rod structure in the arm openings, and means restraining longitudinal displacement of the rod structure from the arms, said rubber mountings restraining turning movement of the axle about its axis.

6. A radius rod structure comprising a pair of diverging members lying in substantially the same vertical plane, a universal joint member secured to the apex ends of the members, mounting studs at the spaced ends of the members, and vertically extending brace members between and secured to the diverging members.

JAMES MacVEIGH.

References Cited in the file of this patent

UNITED STATES PATENTS

| Number | Name | Date |
|---|---|---|
| 2,098,949 | Geissen | Nov. 16, 1937 |
| 2,121,876 | Lee | June 28, 1938 |